: US010114468B2

United States Patent
Ette et al.

(10) Patent No.: US 10,114,468 B2
(45) Date of Patent: Oct. 30, 2018

(54) METHOD FOR EVALUATING GESTURES

(71) Applicant: Volkswagen Aktiengesellschaft, Wolfsburg (DE)

(72) Inventors: Bernd Ette, Wolfsburg (DE); Volker Wintsche, Dresden (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/387,816

(22) Filed: Dec. 22, 2016

(65) Prior Publication Data
US 2017/0192520 A1    Jul. 6, 2017

(30) Foreign Application Priority Data

Jan. 4, 2016  (DE) .......................... 10 2016 100 075

(51) Int. Cl.
*G06F 3/01* (2006.01)
*G06F 3/03* (2006.01)
*G06K 9/00* (2006.01)

(52) U.S. Cl.
CPC ............ *G06F 3/017* (2013.01); *G06F 3/0325* (2013.01); *G06K 9/00355* (2013.01); *G06K 9/00791* (2013.01)

(58) Field of Classification Search
CPC ...... G06F 3/017; G06F 3/0325; G06F 3/0304; G06F 3/0416; G06F 1/3231; G06K 9/00355; G06K 9/00791
USPC ......................................................... 345/156
See application file for complete search history.

(56) References Cited

U.S. PATENT DOCUMENTS

| 9,377,355 B2* | 6/2016 | Chang ................... G01J 1/4204 |
| 9,766,710 B2* | 9/2017 | Kettle ..................... G06F 3/017 |
| 2010/0013860 A1* | 1/2010 | Mandella ............... G01B 21/04 345/650 |
| 2012/0235903 A1 | 9/2012 | Im | |
| 2012/0280904 A1* | 11/2012 | Skurnik ............... G06F 3/0416 345/156 |
| 2013/0127710 A1* | 5/2013 | Simpkins .............. G06F 3/0304 345/157 |

(Continued)

OTHER PUBLICATIONS

Feng-Sheng Chen et al: "Hand gesture recognition using a real-time tracking method and hidden Markov models", Image and Vision Computing, Bd. 21, Nt. 8, Aug. 1, 2003 (Aug. 1, 2003) pp. 745-758, XP055159348, ISSN: 0262-8856, DOI: 10. 1016/50262-8856(03)00070-2.

(Continued)

*Primary Examiner* — Fred Tzeng
(74) *Attorney, Agent, or Firm* — 2SPL Patentanwaelte PartG mbB; Mani Arabi (57) ABSTRACT

A method for evaluating gestures based on data of a sensor having lateral drift-field photodetector diodes (LDPD) diodes, the method includes sequentially measuring first, extraneous light in order to obtain two dimensional (2D) data in the form of reflectance data; measuring second, laser light in order to obtain three dimensional (3D) data in the form of distance data; measuring third, residual light; obtaining movement artifacts in the 2D and/or 3D data which were caused by residual charges in a moved object; detecting a movement by processing the movement artifacts; and evaluating the detected movement with regards to a possible gesture.

11 Claims, 5 Drawing Sheets

(56) References Cited

U.S. PATENT DOCUMENTS

| | | | |
|---|---|---|---|
| 2013/0162520 A1* | 6/2013 | Kettle | G06F 3/017 345/156 |
| 2013/0204457 A1 | 8/2013 | King et al. | |
| 2013/0307775 A1* | 11/2013 | Raynor | G06F 3/017 345/158 |
| 2016/0239097 A1* | 8/2016 | Trattler | G06F 1/3231 |
| 2017/0075426 A1* | 3/2017 | Camacho Perez | G06F 3/017 |

OTHER PUBLICATIONS

Han Sang-Man et al: "A 413240-pixel sub-centimeter resolution Time-of-Flight CMOS image sensor with in-pixel background canceling using lateral-electric-field charge modulators", IEEE International Solid State Circuits Conference, IEEE Service Center, New York, NY, US, Feb. 9, 2014 (Feb. 9, 2014), pp. 130-131, XP032575097,ISSN: 0193-6530, DOI:

Han Sang-Man et al: "A Time-of-Flight Range Image Sensor With BackgroundCanceling Lock-in Pixels Based on Lateral Electric Field Charge Modulation", IEEE Journal of the Electron Devices Society, IEEE, USA, Bd. 3, Nr. 3, May 1, 2015 (May 1, 2015), pp. 267-275, XP011579294, DOI: 10. 1109/JEDS.2014.2382689.

Eshed Ohn-Bar et al; "Hand Gesture Recognition in Real Time for Automotive Interfaces: A Multimodal Vision-Based Approach and Evaluations", IEEE Transactions of Intelligent Transportation Systems, vol. 15, No. 6, Dec. 2014.

Fraunhofer-Gesellschaft; "High-speed CMOS sensors provide better images"; Public Release: Jan. 13, 2012; http://www.eurekalert.org/pub_releases/2012-01/f-hcs011312.php.

Piercarlo Dondi et al; Gesture Recognition by Data Fusion of Time-of-Flight and Color Cameras; World Academy of Science, Engineering and Technology, International Journal of Computer, Electrical, Automation, Control and Information Engineering vol. 5, No. 11, 2011.

Michael Van den Bergh et al; "Combining RGB and ToF Cameras for Real-time 3D Hand Gesture Interaction".

* cited by examiner

METHOD FOR EVALUATING GESTURES

FIELD

The invention relates to a method for evaluating gestures, a vehicle having a sensor, and a computer program product.

BACKGROUND

In vehicles, importance is increasingly attached to the fact that the operation, in this context specifically the operation of an actuator, e.g., a tailgate, from outside the vehicle is facilitated.

To reliably determine movements, specifically faster movements, and to identify them as gestures is no small task and it mostly required significant effort in sensor technology and/or computing power.

Insufficient movement information from capacitive sensors having an approximately 20 cm range complicates the detection of different movement patterns at long distance if, for example, distances of up to two meters should be considered.

The electricity consumption of gesture determination systems is too high due to the computing power required. Opening, closing the tailgate is only performed upon dwell time in an obtaining area and a directed movement of an individual object. The times taken for the foot to dwell per kick or also the time in a regional late detection area slow down the opening of the tailgate.

Optical systems operate with reflecting methods so that the object determination depends on the degree of reflection of the feet or the leg. Consequently, the distance between foot and sensor may differ greatly. To remove by calculation a vector from the chronological images increases the required computing power of the existing processor, and thus the standby current and the necessary computing power of the processor rise disproportionately.

DE 10 2008 052 928 A1 discloses an apparatus for determining gestures in an image, comprising a Hough transformer designed to identify elements in the image or in a preprocessed version of the image as identified gesture elements which are then compared to a database.

DE 10 2011 082 881 A1 discloses a method for illustrating the environment of the motor vehicle in a particular view in a motor vehicle, wherein spatial information, e.g., depth information or spatial coordinates, is determined with regard to the image information recorded, e.g., by means of a stereo triangulation procedure.

DE 10 2013 004 073 A1 discloses a method for determining activities obtained in video streams for monitoring. It is provided here that data relating to frame differences is accumulated for frame sequences in fields, gradients and/or value difference intervals are determined in the accumulator fields, and activity is concluded from the gradients.

It is now the object of the invention to lower the structural requirements relating to the determination of gestures.

SUMMARY

This task is solved by a method of claim 1, a vehicle of claim 10 and/or a computer program product of claim 11.

The inventive method for evaluating gestures based on data of a sensor having LDPD diodes comprises:
Sequentially measuring by the sensor in order obtain a gesture, by measuring firstly extraneous light in order obtain 2D data in the form of reflectance data, secondly laser light in order obtain 3D data in the form of distance data, and thirdly residual light;
obtaining movement artifacts in the 2D data and/or the 3D data which were caused in moved objects by residual charges;
Detecting a movement by only processing the movement artifacts; and
Evaluating the detected movement with regard to possible gestures.

By sequentially measuring, also referred to as one-tap procedure, the movement artifacts become significant at higher speeds. Thus, the quantification of movement artifacts may be used for the vector calculation of the movement and of the speed as well. By switching to one-tap sequence, the evaluation of the sensor data may supply approach data and distance information as well as the movement vector at a low computing power.

Traditionally, the circuit for three (3) taps is executed in triplicate. In the one-tap solution proposed here, only one circuit is required. Thus, the three diodes are operated in a parallel connection and are fed to a capacitor. Due to this parallel connection of the diodes, the processed image of the real image is provided with residual charges of the image sequence. In case of fast movements of the hand or of the foot, a sequenced image is therefore presented. Comparable to a mouse cursor, the direction, i.e., the vector, of a movement may be determined.

The inventive method has the advantage that the approach can be determined in a vector-based manner without the 3D information of the sensor. Thus, less computing power of the processor is required and the standby current drops. Based on the evaluation of the quantification of movement artifacts, the speed information may be calculated based on the edges and the vector may be calculated based on the pixel boundaries. By the parallel assessment of the movement artifacts and/or the filtering, precise images may be generated for the object determination despite the high frame rate. The movement artifacts may be obtained from both the 2D data and the 3D data. An advantage is here that it is not necessary to further process the complete image area but only the movement artifacts obtained, which significantly reduces the time required for computing.

A quantification of the movement artifacts at the edges of the moved object may be used for the calculation of a movement vector. As part of a quantification, e.g., an edge or point closest to the sensor may be used in each measurement, i.e., in each image or frame. Connecting these edges or points then results in the movement vector or a movement trajectory.

A quantification of movement artifacts at the edges of the moved object may be used for the calculation of an approach speed of the moved object towards the sensor. In case of a known frame rate, e.g., ten images per second, the speed of the object may be determined using edges or points determined in the individual images.

After determination of a directed movement towards a gesture area, a filter for reducing the movement artifacts may be switched on. It may be that, after the determination of a directed movement, it is switched from an approach mode, in which the approach as such and its speed are detected, to a gesture mode, in which gestures are to be specifically determined. In this gesture mode executed in a relatively small area arranged close to the sensor, e.g., approximately five to fifty centimeters, excessive movement artifacts may then disturb.

The 3D data may be evaluated in order to determine a stationary object. As no movement artifacts occur in case of stationary objects, it is switched to the 3D measurement in this special case. In case of a repeated movement, it may be switched again to the 2D measurement.

Switching of evaluation from the 2D data to the 3D data may take place when determining fast objects. Here, the 2D data and/or 2D measurement is taken as a basis for a distance measurement which is actually based on the 3D data and/or 3D measurement. If now the objects or movements get too fast for the 2D measurement, this is determined and it may be switched to the 3D measurement in order to correctly determine the fast movements as well.

In addition to the movement detection using the 2D data, a movement detection may take place using the 3D data and the results are checked for plausibility. This variant may be opted for if, for example, particular requirements are imposed regarding the accuracy of the measurement or the determination of gestures. The parallel 2D and 3D evaluation may also be used for calibration purposes or the training of gestures and/or persons.

It may be provided that an actuator is operated after a detected approach and/or after a detected gesture. The operation of an actuator is mostly subject to high safety requirements that are met in an easy and quick manner by the method proposed herein.

It may further be provided that the sensor is arranged in a vehicle and that, only after successful identification of a person performing the approach and/or the gesture by a keyless entry procedure, an actuator of the vehicle is operated. This application is particularly suitable for the method, as a variety of possible users and gestures encounter here control devices often comprising a rather low computing power.

The inventive vehicle comprises a sensor having LDPD diodes and a control device connected to the sensor, wherein the device is configured to execute a previously described method. The same advantages and modifications as described above apply.

The inventive computer program product comprises a program code to perform the previously described method if the program product is executed on a computing unit or a control unit of a vehicle. The same advantages and modifications as described above apply.

Further preferred configurations of the invention result from the remaining features stated in the sub-claims.

The various embodiments of the invention mentioned in this application can advantageously be combined with each other unless otherwise stated in the individual case.

BRIEF DESCRIPTION OF THE FIGURES

The invention is hereinafter explained in embodiments using the associated drawings, in which.

DETAILED DESCRIPTION

Figure 1:
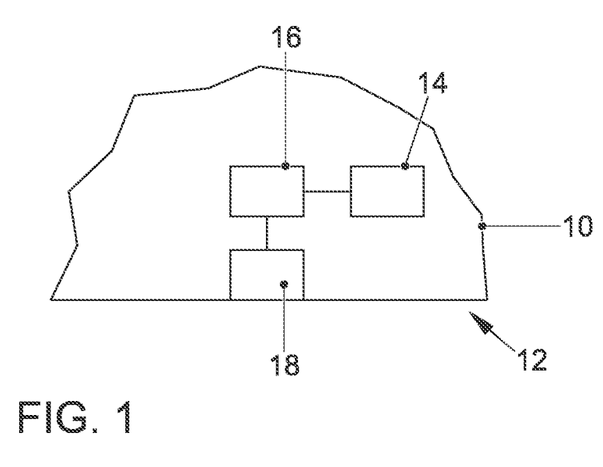
FIG. 1 shows a schematic representation of a vehicle having a sensor.

FIG. 1 shows an area of a vehicle 10, e.g., a section of a rear bumper of a passenger vehicle. Trucks, buses, motorcycles, rail vehicles as well as aircrafts and watercrafts continue to be deemed to be vehicles.

The vehicle 10 comprises an apparatus 12 for determining gestures. The apparatus 12 may further be configured for external operation of an actuator 14 of the vehicle 10. For example, the actuator 14 is an electric motor for opening and/or closing a trunk lid. The apparatus 12 further comprises a control device 16 connected to the actuator 14, directly or via further elements, e.g., further control devices. Furthermore, the apparatus 12 comprises a sensor 18 having diodes sensitive to radiation, particularly sensitive to light. For example, photodiodes, photodiodes suitable for laser or, in this example, LDPD diodes (Lateral Drift-Field Photodetector Diodes) are used.

Here, for example, three LDPD (Lateral Drift-Field Photodetector Diodes) are used per pixel. For example, these LDPD diodes are arranged in a 30 by 30 matrix structure. If three LDPDs are used per pixel, a simultaneous processed image of the reflection of one pixel is always available for calculation of the distance. To increase the sensitivity of a pixel, the measured values $Q1$, $Q2$, $Q3$ are sequentially read out. This provides higher values; however, there are residual charges distorting the image.

The sensor 18 and/or its measured values are used to determine gestures and to determine an approach of an object, e.g., a person or a person's hand or foot. An approach may also be classified as a gesture.

The image data of the sensor 18 is transferred to the control device 16 that then carries out the evaluation of the data. Depending on the evaluation, i.e., for example of a determined gesture, the actuator 14 is operated via a control command. For example, swiping a hand in one direction may close a trunk lid, while swiping it in the other direction may open the trunk lid.

Figure 2:
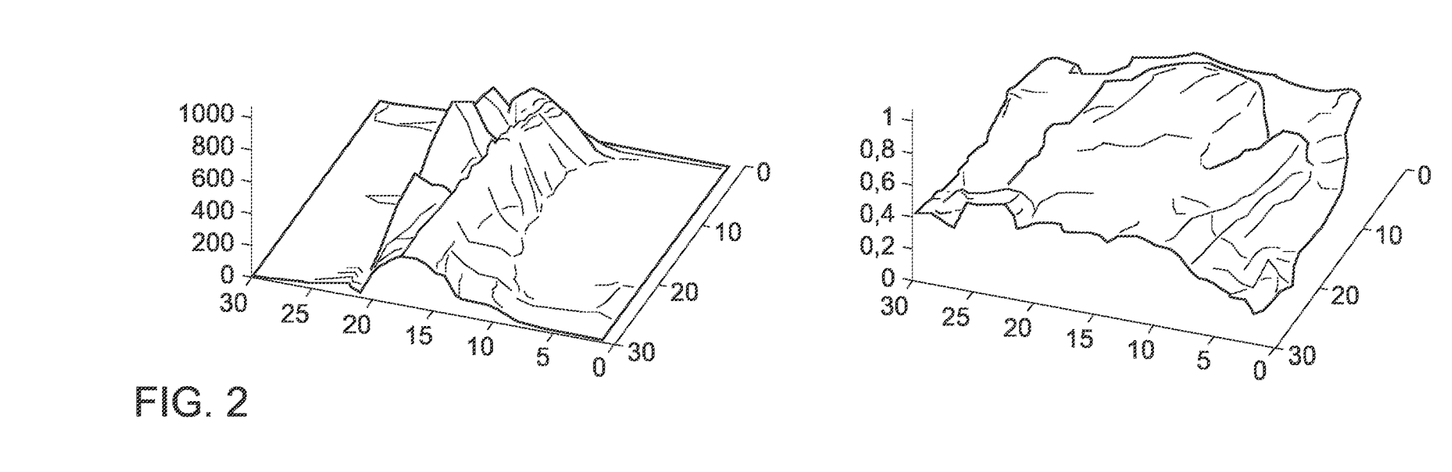
FIG. 2 shows a schematic representation of two sensor data sets of one stationary object.

FIG. 2 shows two representations of measured values of the sensor 18 for a stationary, i.e. non-moving, object, here a foot. On the left side of FIG. 2, the 2D data of the sensor 18, i.e., the reflectance data, is presented. The individual pixels or diodes are arranged in a 30 by 30 matrix which is plotted on the x-axis and y-axis. The digits, i.e., the count values, of the respective pixels are plotted on the Z-axis. According to the reflection from the foot, the reflectance data produces an image of a processed image of the foot. On the right side of FIG. 2, the 3D data of the sensor 18, i.e., the distance data, is presented. The individual pixels or diodes are arranged in a 30 by 30 matrix which is plotted on the x-axis and y-axis. The digits, i.e., the count values, of the respective pixels are plotted on the Z-axis.

As the foot is in standing position, no movement artifacts are available in both the 2D data and the 3D data of the sensor 18.

Figure 3:
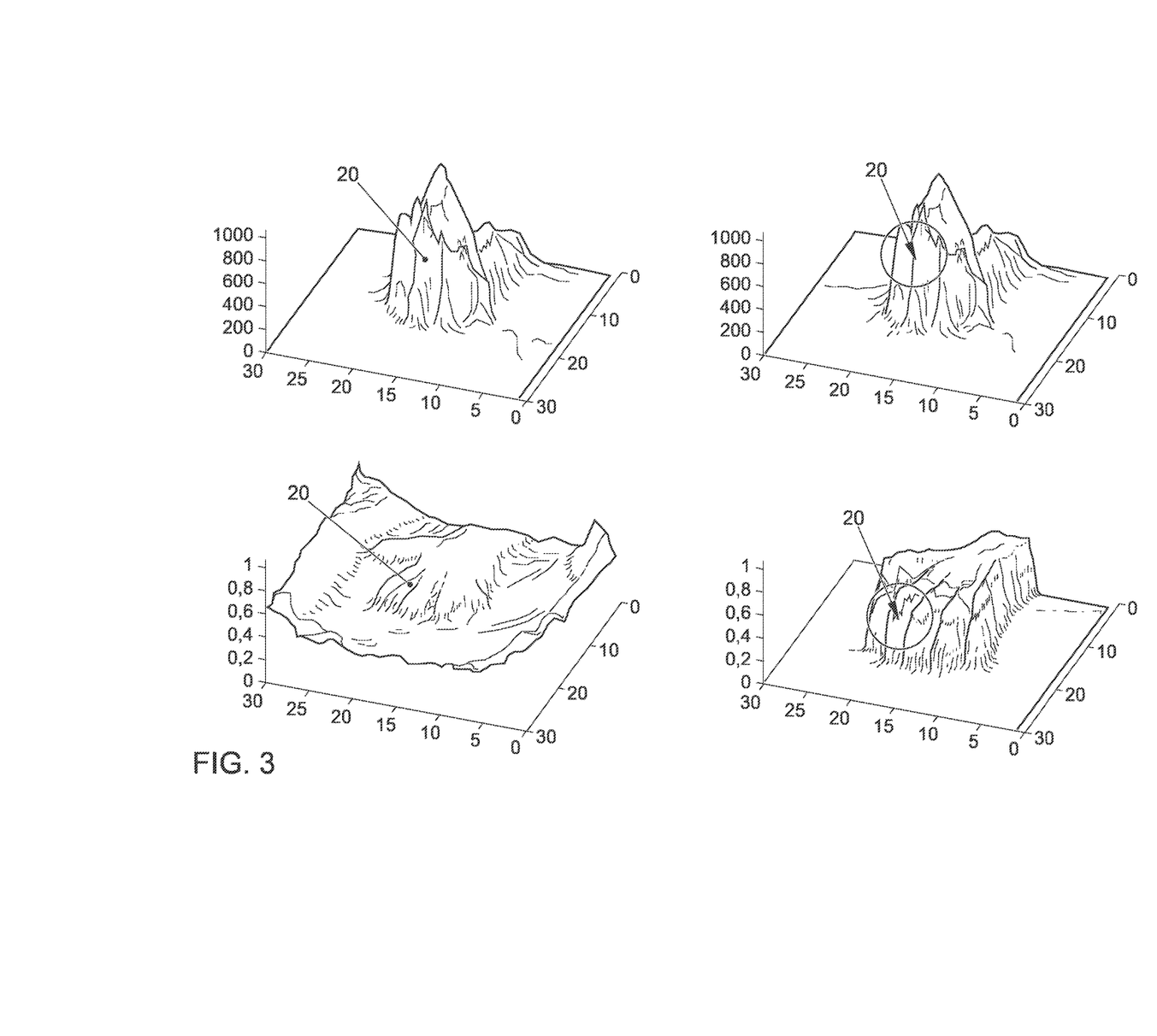
FIG. 3 shows a schematic representation of four sensor data sets of one moving object.

FIG. 3 shows four representations of four sensor data sets of a moving object, in this example of a moving hand performing a swipe gesture. The two representations at the top show 2D data of the sensor 18 and the two representations at the bottom show 3D data of the sensor 18. The axes of the diagrams correspond to the axes from FIG. 2.

At the top left, the original, i.e. unprocessed, data is presented. At the top right, the 2D data is cleaned. In both representations, movement artifacts 20 exist, particularly in the area of the fingertips.

The movement artifacts 20 are more pronounced in case of the 3D data; they can also be found particularly in the area of the fingertips. Once again, the original 3D data can be found on the left, while processed, here segmented, 3D data of the sensor 18 is presented on the right.

Using these movement artifacts 20 each comprising only a few pixels, an object, e.g., a foot or a hand, may be characterized. This facilitates the image editing and/or image processing performed in the control device 16 or another computing unit. This saves computing time and/or increases the processing speed.

Figure 4:
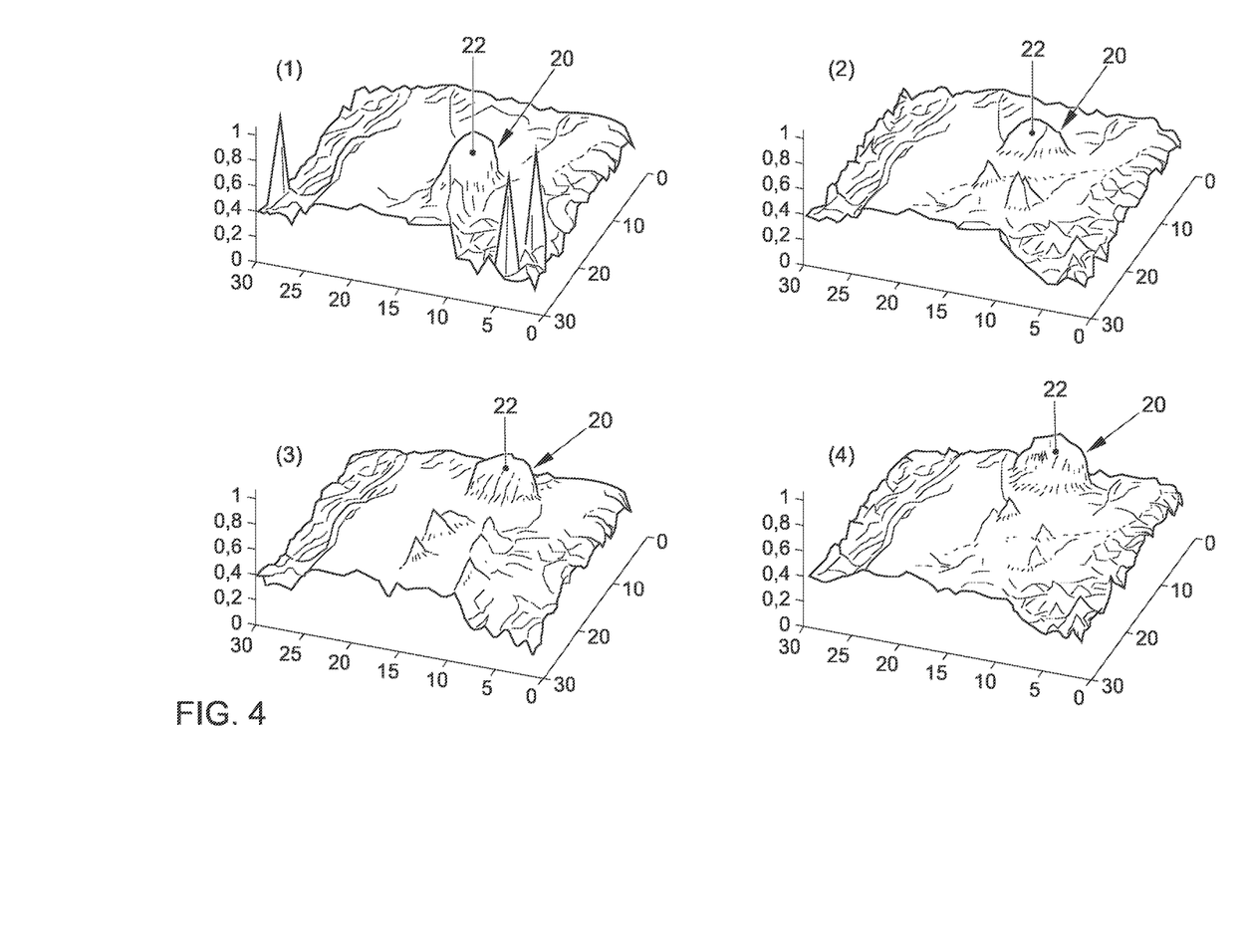
FIG. 4 shows a schematic representation of four temporally offset sensor data sets of one moving object.

FIG. 4 now shows a chronological sequence of 3D data of the sensor 18. The representation denoted with (1) at the left top is the chronologically first 3D data set, the 3D data sets denoted with (2), (3) and (4) follow. The axes of the diagrams correspond to the axes from FIGS. 2 and 3. Here, 3D data sets are used but without processing the 3D information of the sensor 18. The 3D data sets are illustrated here, as they show the movement artifacts 20 more clearly. 2D data sets of the sensor 18 may also be used.

Representations (1) to (4) show a moving object using the example of a foot when approaching the sensor 18. In all four images, movement artifacts 20 can be seen located at an edge of the object which is at the front in relation to the direction of movement. Here, this edge or this bordering faces the sensor 18. Based on the chronological sequence of the movement artifacts 20 alone, the direction of the movement may be determined. In case of a known frame rate, which may be measured in the control device 16 or be output by the sensor 18 to the control device 16, the speed of the object may also be calculated.

By quantifying the movement artifacts at the edges of the moving object, the calculations for the movement or a movement vector and/or the approach speed of the moved object towards the sensor may be simplified once again.

For this purpose, a quantization point 22 is calculated in each data set for each data set and/or for each movement artifact 20. In this example, the quantization point 22 is the point comprising the smallest distance to the sensor 18. Other calculations for the quantization point 22 are also possible, e.g., the centroid of the movement artifact 20 or the highest value of the movement artifact 20.

As it can be seen in the sequence of the four representations (1) to (4), the quantization point 22 moves towards the sensor 18. The coordinates of these four quantization points 22 may be used as values for a movement vector. If the frame rate is known, the speed of the object may also be calculated based on the quantization points 22. This reduction to the quantization points 22 when calculating the movement and/or the speed of the object significantly simplifies the calculation, as it is not required to further process the complete image area.

The working principle of an approach determination of a person towards a vehicle 10 may, for example, be as follows. Initially, it is checked as to whether the person passes by the sensor 18 or vehicle 10 or whether they walk directly towards the sensor 18 or the vehicle 10. This is done as described above using the movement artifacts 20 and/or the quantization points 22.

If an approach is found, the authorization of the approaching person, e.g., to open the vehicle 10, is examined by a keyless entry procedure. Only after successful identification of a person performing the approach and/or the gesture, the method continues.

In a next step, an evaluation area of the sensor 18 or of the steps may be adjusted depending on the environmental conditions such as blocking objects, e.g., other parked vehicles, or the walking speed determined.

If the person continues to move towards the sensor 18 or vehicle 10, an optical feedback in the form of an indicated gesture area is for example provided, in which a gesture is obtained and processed. Then, the person may perform specific gestures that, as described above, are evaluated using the movement artifacts 20 and/or the quantization points 22.

Figure 5:
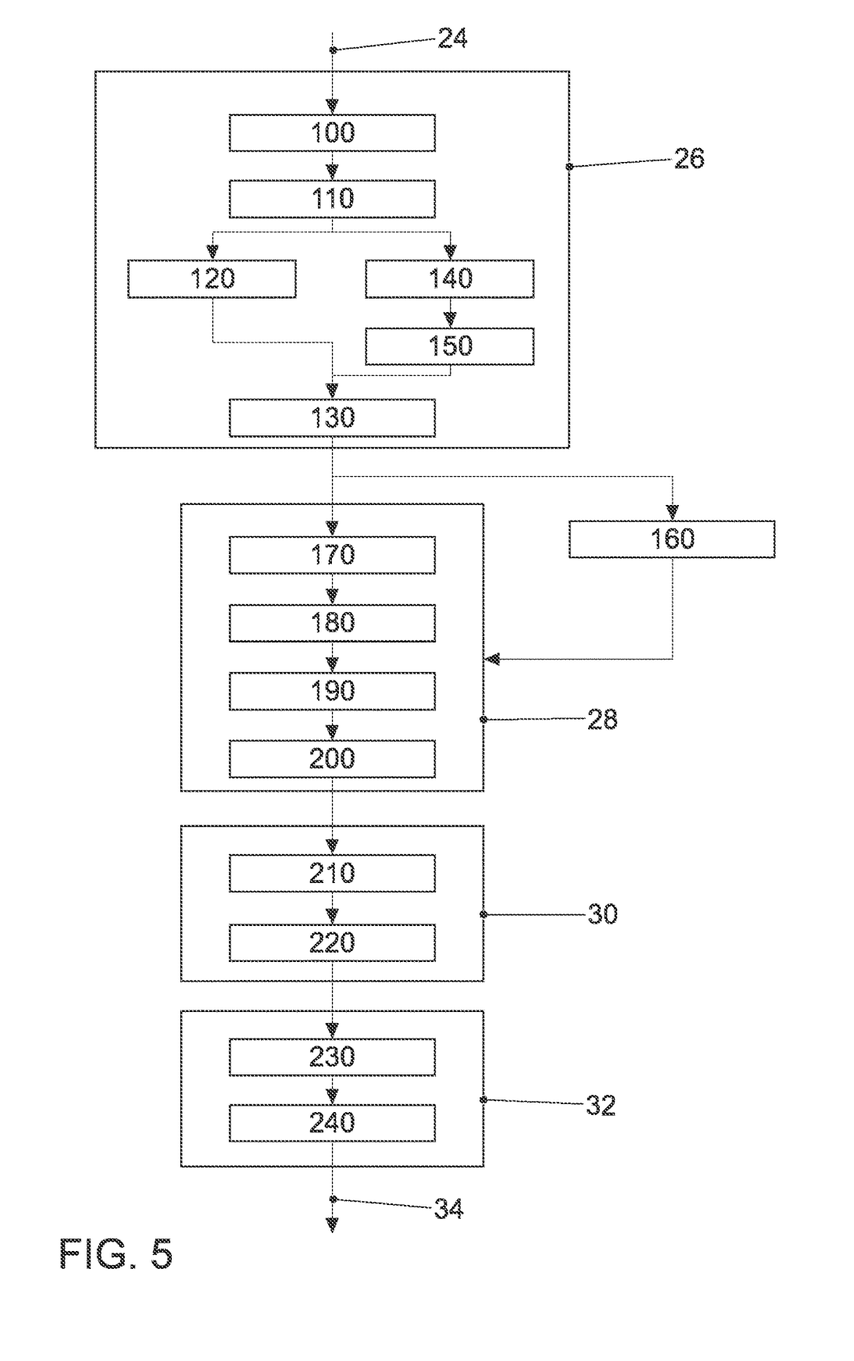
FIG. 5 shows a flow diagram of data processing for an evaluation of gestures.

Using FIG. 5, a data processing flow diagram is described in order to evaluate gestures. The method illustrated in the flow diagram is here executed in the control device 16.

An input signal 24 is received by the sensor 18 and is initially fed to a signal processing 26 block. There, the input signal 24 is processed and an object segmentation is performed.

In a first step 100, background cleaning is performed in order to reduce the data volume and to simplify the evaluation.

In a step 110, a 2D movement detection is performed by filtering the reflective data. The 2D movement detection is performed as described above using the movement artifacts 20 and/or the quantization points 22. Subsequently, the sequence branches into two evaluations performed in parallel.

In a first parallel step 120, movement artifacts are removed to improve the determination of objects and gestures.

In a step 130, a 3D movement detection, i.e., a distance measurement, is performed to determine the distance to the sensor 18 in case of statistical data or images as well.

In a second evaluation performed in parallel, the quantification of movement artifacts is performed, as described above, in a step 140.

In a step 150, the segmentation of the 3D object is performed resulting in improved data processing.

The 3D movement detection performed in the step 130 may be done in the conventional way, i.e. the entire image is processed, which is the case if the step 120 was selected. On the other hand, or in parallel, the 3D movement detection may be performed by only processing the movement artifacts 20 and/or the quantization points 22, which is the case if the steps 140 and 150 were selected.

In a step 160, the approach determination is activated; this takes place depending on the evaluations of the determined direction and/or of the determined speed of the approaching object. If the approach determined is not activated, e.g., because a passer-by has only passed by the vehicle, it is branched back to the beginning of the method or the observation is interrupted or discontinued.

In case of an activated approach determination, a feature extraction 28 block is called, into which the output signal of the signal processing 26 block is fed.

In a step 170, 2D movement tracking is performed by tracking the movement artifacts 20 and/or the quantization points 22 from the 2D data via the chronological sequence of the images or frames of the sensor 18. Thus, it may be detected that the sequence of steps of the person approaching is continued. The point where the sequence of steps ends or which distance there is cannot be determined here.

In a step 180, 3D movement tracking is performed, e.g., by tracking the movement artifacts 20 and/or the quantization points 22 from the 3D data via the chronological sequence of the images or frames of the sensor 18.

In a step 190, a distance measurement of the object and/or the objects is performed. Thus, the distance from the object to the sensor 18 can precisely be determined.

In a step 200, a feature extraction of segmented objects takes place, wherein foreign objects, i.e., those not to be considered here, are extracted from the image or the data in order to simplify the evaluation and calculation.

Subsequently, the method continues to an event detection 30 block, wherein the extracted features are examined.

In a step 210, features are checked for events. For example, the tracking is examined: In which direction do the centroid, the movement artifact 20 and/or the quantization point 22 move? Then, the object approaching or the object passing by the sensor 18 may be found as an event. Specific movement patterns, e.g. swipe gestures or positions of the foot, may also be events.

In a step 220, a feature vector is generated. For example, this may be a vector, a chronological sequence of movement artifacts 20 and/or quantization points 22 or comprising a movement from left to right.

Subsequently, the method enters an event and gesture classification 32 block, wherein the events are matched to gestures.

In a step 230, gestures are classified, i.e., it is specified and/or checked as to which gestures are available or are approved at all.

In a step 240, the classification is post-processed. Based on the classification, an output signal 34 is generated there, e.g., in an output as a bit pattern. The output signal is output to the vehicle 10, e.g., directly to the actuator 14 which then performs the movement corresponding to the detected gesture.

An advantage of the method presented herein is that it is not necessary to further process the complete image area but only the movement artifacts 20 obtained and/or the quantization points 22 obtained, which significantly reduces the time required for computing.

LIST OF REFERENCE NUMBERS 10 vehicle
12 apparatus
14 actuator
16 control device
18 sensor
20 movement artifact
22 quantization point
24 input signal
26 signal processing
28 feature extraction
30 event detection
32 event and gesture classification
34 output signal
100 step
110 step
120 step
130 step
140 step
150 step
160 step
170 step
180 step
190 step
200 step
210 step
220 step
230 step
240 step

What is claimed is:

1. A method for evaluating gestures based on data of a sensor having lateral drift-field photodetector diodes (LDPD), the method comprising:
sequentially measuring first, extraneous light in order to obtain two dimensional (2D) data in the form of reflectance data;
measuring second, laser light in order to obtain three dimensional (3D) data in the form of distance data;
measuring third, residual light;
obtaining movement artifacts in the 2D and/or 3D data which were caused by residual charges in a moved object;
detecting a movement by processing the movement artifacts; and
evaluating the detected movement with regards to a possible gesture.

2. The method of claim 1, characterized in that a quantification of movement artifacts at the edges of the moved object is used for the calculation of a movement vector.

3. The method of claim 1, characterized in that a quantification of movement artifacts at the edges of the moved object is used for the calculation of an approach speed of the moved object towards the sensor.

4. The method of claim 1, characterized in that, after determination of a directed movement towards a gesture area, a filter for reducing the movement artifacts is switched on.

5. The method of claim 1, characterized in that the 3D data for determining a stationary object is evaluated.

6. The method of claim 1, characterized in that switching of evaluation from the 2D data to the 3D data takes places when determining fast objects.

7. The method of claim 1, characterized in that, in addition to the movement detection using the 2D data, a movement detection takes place using the 3D data and the results are checked for plausibility.

8. The method of claim 1, characterized in that an actuator is operated after a detected approach and/or after a detected gesture.

9. The method of claim 8, characterized in that the sensor is arranged in a vehicle and that, only after successful identification of a person performing the approach and/or the gesture by a keyless entry procedure, an actuator of the vehicle is operated.

10. A vehicle comprising a sensor having lateral drift-field photodetector diodes (LDPD) and a control device connected to the sensor, characterized in that the control device is configured to execute a method of claim 1.

11. A computer program product having a program code to perform, if the program product is executed on a computing unit or a control device of a vehicle, a method for evaluating gestures based on data of a sensor having lateral drift-field photodetector diodes (LDPD), the program comprising:
sequentially measuring first, extraneous light in order to obtain two dimensional (2D) data in the form of reflectance data;
measuring second, laser light in order to obtain three dimensional (3D) data in the form of distance data;
measuring third, residual light;
obtaining movement artifacts in the 2D and/or 3D data which were caused by residual charges in a moved object;
detecting a movement by processing the movement artifacts; and
evaluating the detected movement with regards to a possible gesture.

* * * * *